United States Patent
Rampal et al.

(10) Patent No.: US 7,525,949 B1
(45) Date of Patent: Apr. 28, 2009

(54) FORWARDING FOR NETWORK DEVICES

(75) Inventors: Sanjeev Rampal, Cary, NC (US); Alvaro Retana, RTP, NC (US); Russell White, RTP, NC (US); Jimmy Ervin, Raleigh, NC (US); Hoe Trinh, RTP, NC (US)

(73) Assignee: Cisco Technology, Inc., San Jose, CA (US)

( * ) Notice: Subject to any disclaimer, the term of this patent is extended or adjusted under 35 U.S.C. 154(b) by 1021 days.

(21) Appl. No.: 10/140,613

(22) Filed: May 7, 2002

(51) Int. Cl.
H04L 12/66 (2006.01)
(52) U.S. Cl. ............... 370/352; 370/401; 370/475
(58) Field of Classification Search ............... None
See application file for complete search history.

(56) References Cited

U.S. PATENT DOCUMENTS

| | | | | |
|---|---|---|---|---|
| 5,708,654 A * | 1/1998 | Arndt et al. | ............... | 370/242 |
| 5,917,820 A * | 6/1999 | Rekhter | ............... | 370/392 |
| 5,958,018 A * | 9/1999 | Eng et al. | ............... | 370/401 |
| 6,101,188 A * | 8/2000 | Sekine et al. | ............... | 370/401 |
| 6,118,771 A * | 9/2000 | Tajika et al. | ............... | 370/401 |
| 6,130,892 A * | 10/2000 | Short et al. | ............... | 370/401 |
| 6,178,455 B1 | 1/2001 | Schutte et al. | ............... | 709/228 |
| 6,208,656 B1 | 3/2001 | Hrastar et al. | ............... | 370/401 |
| 6,256,739 B1 * | 7/2001 | Skopp et al. | ............... | 726/2 |
| 6,286,058 B1 | 9/2001 | Hrastar et al. | ............... | 710/8 |
| 6,301,223 B1 | 10/2001 | Hrastar et al. | ............... | 370/227 |
| 6,353,614 B1 | 3/2002 | Borella et al. | ............... | 370/389 |
| 6,370,584 B1 | 4/2002 | Bestavros et al. | ............... | 709/238 |
| 6,473,413 B1 * | 10/2002 | Chiou et al. | ............... | 370/331 |
| 6,591,306 B1 * | 7/2003 | Redlich | ............... | 709/245 |
| 6,603,769 B1 * | 8/2003 | Thubert et al. | ............... | 370/401 |
| 6,671,281 B1 * | 12/2003 | Tsuda | ............... | 370/396 |
| 6,678,725 B1 * | 1/2004 | Britton et al. | ............... | 709/220 |
| 6,701,361 B1 * | 3/2004 | Meier | ............... | 709/224 |
| 6,751,221 B1 * | 6/2004 | Saito et al. | ............... | 370/392 |
| 6,791,949 B1 * | 9/2004 | Ryu et al. | ............... | 370/254 |
| 6,880,089 B1 * | 4/2005 | Bommareddy et al. | ............... | 726/11 |
| 7,088,727 B1 * | 8/2006 | Short et al. | ............... | 370/401 |
| 2002/0186685 A1 * | 12/2002 | O'Brien et al. | ............... | 370/352 |
| 2003/0202505 A1 * | 10/2003 | Ozugur | ............... | 370/352 |
| 2004/0111640 A1 * | 6/2004 | Baum | ............... | 713/201 |
| 2004/0213260 A1 * | 10/2004 | Leung et al. | ............... | 370/395.3 |
| 2006/0041682 A1 * | 2/2006 | Johnson et al. | ............... | 709/242 |

\* cited by examiner

*Primary Examiner*—Ricky Ngo
*Assistant Examiner*—Phuongchau B Nguyen
(74) *Attorney, Agent, or Firm*—Cindy Kaplan

(57) ABSTRACT

Techniques for implementing forwarding in network devices are provided. Proxy addresses are used in place of next hop addresses so that a large routing table is not required. Pairs of proxy IP and MAC addresses can be used to allow this optimization to occur completely transparent to any other device in the network. One or more smaller tables can be utilized in place of a large routing table to more efficiently implement forwarding. Additionally, the technique can be utilized without requiring modification of other hardware devices in the network.

19 Claims, 6 Drawing Sheets

ROUTING TABLE

| IP ROUTE | NEXT HOP |
|---|---|
| IP ADDRESS$_1$ | NEXT HOP$_1$ |
| IP ADDRESS$_2$ | NEXT HOP$_2$ |
| IP ADDRESS$_3$ | NEXT HOP$_2$ |
| IP ADDRESS$_4$ | NEXT HOP$_2$ |
| IP ADDRESS$_5$ | NEXT HOP$_1$ |
| ⋮ | ⋮ |
| IP ADDRESS$_N$ | NEXT HOP$_2$ |

*FIG. 3*
(Prior Art)

PROXY TABLE

| IP ADDRESS | MAC ADDRESS |
|---|---|
| IP ADDRESS$_1$ (I$_1$)<br>IP ADDRESS$_2$ (I$_2$) | MAC ADDRESS$_1$ (M$_1$)<br>MAC ADDRESS$_2$ (M$_2$) |

*FIG. 4*

NEXT HOP TABLE

| MAC ADDRESS | NEXT HOP |
|---|---|
| MAC ADDRESS$_1$ (M$_1$)<br>MAC ADDRESS$_2$ (M$_2$) | NEXT HOP$_1$<br>NEXT HOP$_2$ |

*FIG. 5*

FORWARDING FOR NETWORK DEVICES

BACKGROUND OF THE INVENTION

The present invention relates to forwarding for network devices. More specifically, the invention relates to optimizing forwarding that can be utilized on provider edge routers that use the EBGP protocol.

A router is a hardware device that stores and forwards data packets from one hardware device to another. The different hardware devices can be on the same local area network (LAN) or within the same wide area network (WAN). One such wide area network is the Internet.

Support for full Internet routing places a heavy burden on a router. In some cases, the hardware capability of a router which is at the edge of a service provider's network may be constrained to be low due to space, power and other constraints. In such a situation, it becomes especially hard to support full Internet routing at wire rates without having to resort to static routing or some default routing technique.

One of the difficulties in implementing full Internet routing is the size of the routing table. In general, the routing table needs to accommodate every Internet route that the service provider's router becomes aware. For example, it is possible that the routing table may need to store hundreds of thousands of routes. The sheer size of the routing table may require higher processing power for accessing the table and larger storage requirements. In addition with a large routing table the processor in the router has to spend a great percentage of time managing and maintaining the entries in the table thereby not being able to service other tasks on the router in a timely manner. Hence a more powerful processor is need in order to do both efficiently. As the size of the Internet continues to grow rapidly, the severity of these problems continues to increase.

Conventional techniques for addressing this problem have been inadequate. As an example, techniques can be utilized to improve the searching efficiency of a large routing table. Also, internet protocol (IP) address prefix patterns can be identified in order to use address aggregation to reduce the size of the routing table (e.g., CIDR based route aggregation).

Accordingly, it would be beneficial to have innovative techniques for implementing forwarding for network devices. Additionally, it would be beneficial if improvements in a service provider's edge router can be achieved without requiring modification to other routers to which it communicates.

SUMMARY OF THE INVENTION

The present invention provides innovative techniques for implementing forwarding for network devices, such as routers. In general, a route address is advertised with a proxy address instead of the next hop address that was advertised. Typically, the proxy address is not associated externally with any other network device but is defined internally in the network device for forwarding. When a packet is received that is being sent to the proxy address, a table can be utilized to associate the proxy address with the next hop address. Thus, the packet can be correctly sent to the next hop address. Advantages of embodiments of the invention can include drastically smaller routing tables and no requirement that other network devices be modified. Some specific embodiments of the invention are described below.

In one embodiment, the invention provides a method for implementing forwarding in a network device. A message advertising a route address and a next hop address is received. A proxy address is associated with the next hop address. The route address and the proxy address are then advertised, where the proxy address is not associated externally with any other network device but is defined internally in the network device for forwarding. In some embodiments, EBGP is used as the protocol between the network device (e.g., router) that is utilizing the invention and a neighboring network device that is communicating with it.

In another embodiment, the invention provides a method for implementing forwarding in a network device. A first message advertising a route IP address and a next hop address is received. A proxy IP address is associated with the next hop address, such that the proxy IP address is associated with a proxy MAC address and the proxy MAC address is associated with the next hop address. The route IP address and the proxy IP address are advertised. Upon receiving an ARP request for the proxy IP address specified by a packet, the network device responds with the proxy MAC address. The packet that includes the proxy MAC address is received. The proxy MAC address is used to determine the next hop address and the packet is forwarded to the next hop address.

Other features and advantages of the invention will become readily apparent upon review of the following description in association with the accompanying drawings, where the same or similar structures are designated with the same reference numerals.

BRIEF DESCRIPTION OF THE DRAWINGS

FIG. 3 shows a conventional routing table that can be utilized for Internet routes.

FIG. 4 shows an example of a proxy table that can be utilized with an embodiment of the invention.

FIG. 5 shows an example of a next hop table that can be utilized with an embodiment of the invention.

DETAILED DESCRIPTION OF PREFERRED EMBODIMENTS

In the description that follows, the present invention will be described in reference to embodiments that implement forwarding in a network device, such as a router. Additionally, the embodiments utilize the border gateway protocol (BGP) between the routers. However, embodiments of the invention are not limited to any particular environment, protocol, application, or implementation. For example, the invention may be advantageously applied to other environments, including those that utilize different communications protocols (e.g., MPLS). Therefore, the description of the embodiments that follows is for purposes of illustration and not limitation.

Figure 1:
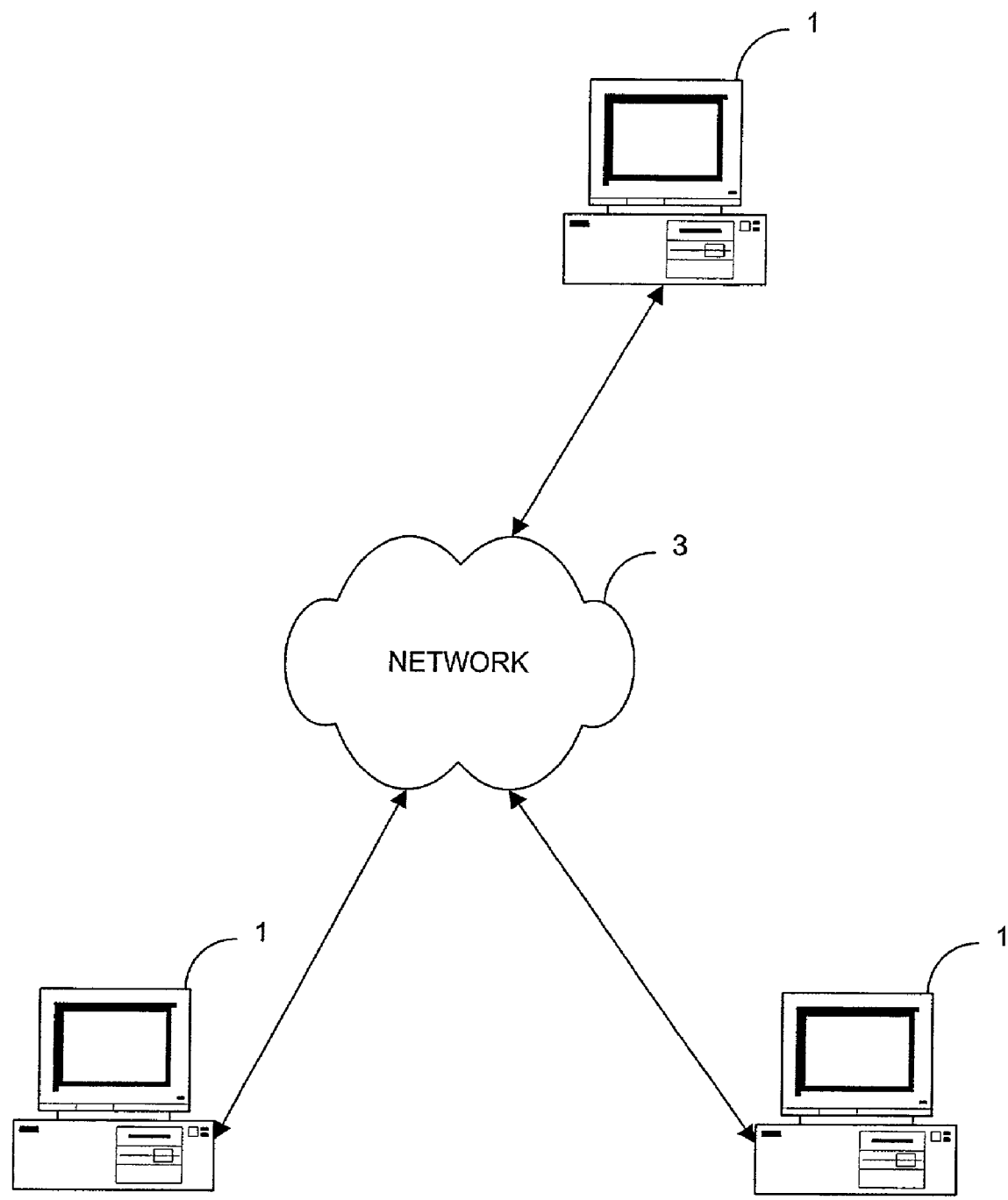
FIG. 1 shows a communications network including multiple computer systems.

FIG. 1 shows an example of a communications network including multiple computer systems. Computer systems 1 communicate through network 3. Computer systems 1 are representative of the multitude of hardware devices that can be present on network 3. Devices can communicate with other devices using wire, optical, wireless, and other media. Network 3 is representative of a local area network, wide area network, (such as the Internet) or any combination of the two.

Figure 2:
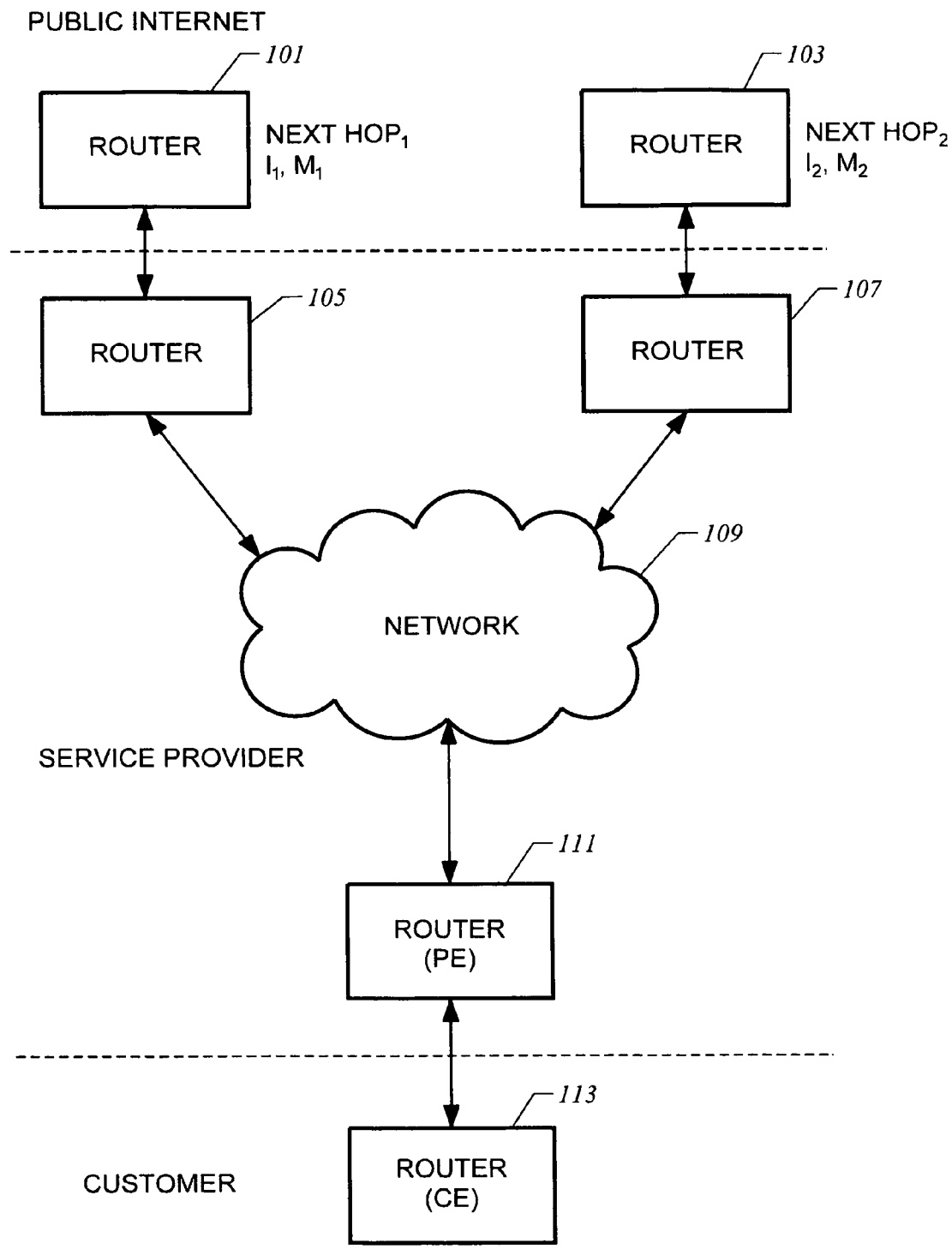
FIG. 2 shows a block diagram of multiple network devices in communication in a network.

FIG. 2 shows a block diagram of a portion of a communications network. The figure shows an environment where an embodiment of the invention can be advantageously applied. As shown, routers 101 and 103 provide communication with the public Internet.

Routers 105 and 107 provide communication between the service provider and the Internet. Typically, the service provider provides services, such as a connection to the Internet, to customers. A network 109 represents the service providers network.

Router 111 provides communication between the service provider and one or more customers through router 113. For simplicity, networks are not shown for the Internet and the customer. Additionally, FIG. 2 shows an example of an environment that can benefit from one embodiment of the invention, but other environments can include fewer or more hardware devices and networks.

In one embodiment, the EBGP protocol is utilized for communication between two routers. An autonomous system (AS) is typically a set of IP routers with a single routing policy and under a single network administrator. The exterior border gateway protocol (EBGP) is a version of BGP that is utilized between routers in different ASs. Accordingly, EBGP may be utilized between routers that communicate across a dashed line shown in FIG. 2.

The interior border gateway protocol (IPGP) is a version BGP that is utilized between routers in the same AS. Accordingly, IPGP may be utilized between any of the service provider's routers shown in FIG. 2 (i.e., between the dashed lines).

Router 111 can also be called the provider edge (PE) router and router 113 can also be called the customer edge (CE) router. As described above, the service provider can be providing public Internet access, but the service provider can also provide other services including virtual private networking, application hosting, and the like.

Routers that utilize EBGP distribute route addresses and the associated next hop address. The next hop address is the address of the router that is next in the chain for the route. For example, for an IP route that should be routed through router 101, router 101 would distribute the IP route and its own IP address as the associated next hop address.

Accordingly, conventional PE routers like router 111 store a routing table that is similar to the one shown in FIG. 3. When router 111 receives an advertisement of an IP route and the associated next hop address, this information is stored in a table. As shown, the routing table shown in FIG. 3 stores different IP routes and their associated next hop addresses.

Unfortunately, in many network topologies, the routing table can become quite large (e.g., hundreds of thousands of routes). In order to manage such a large routing table, there is a demand for high performance hardware capabilities of the PE router.

Router 111 has an IBGP session with every other router in the service provider's network. This PE router will store all the EBGP next hops out of the service provider's network, such as routers 101 and 103. These EBGP next hops will also be advertised to the customer through router 113.

The next hop addresses are the IP addresses that are utilized between the routers, such as between routers 101 and 105. For example, for an IP route through router 101, router 101 would advertise the IP route address and the IP address of router 101 utilized in communication with router 105 as the next hop address.

In one embodiment of the invention, router 111 utilizes a proxy table as shown in FIG. 4 and a next hop table as shown in FIG. 5. In general, the proxy table associates an IP address with an associated media access control (MAC) address. The next hop table stores MAC addresses and associated next hop addresses. Techniques for utilizing the proxy and next hop tables will be discussed in more details below.

The first time that router 111 receives a message advertising an EBGP next hop, router 111 assigns a proxy IP address and an associated proxy MAC address in the proxy table. The proxy addresses are not actual addresses (other network devices would not associate the proxy addresses with existing hardware), however, there may be some limitations on the proxy addresses. For example, the proxy MAC address should not be equal to a MAC address of a real device. Additionally, the proxy IP address should be in the same subnet as the customer's network for reasons described below.

Router 111 stores the proxy MAC address and the associated EBGP next hop address in the next hop table. All of the IP routes through this router (e.g., router 101) will utilize one entry in the proxy table and one entry in the next hop table. As only two EBGP next hop routers, routers 101 and 103, are shown in FIG. 2, there need only be two entries shown in the proxy table and next hop table shown in FIGS. 4 and 5, respectively.

Although the proxy table and next hop table can be larger in some environments, it should be understood that these two drastically smaller tables can replace a conventional routing table that stores hundreds of thousands of entries. The reason is that all of the IP routes through router 101 can be correctly routed using only one entry in the proxy table and one entry in the next hop table as opposed to a large number of entries in the routing table.

Continuing with the example, when router 111 receives a message advertising an EBGP next hop, router 111 advertises to router 113 the IP route and the proxy IP for the router that is the next hop. Router 113 will typically stores the IP route and EBGP next hop (the proxy IP address) in a routing table.

When router 113 attempts to forward a packet to one of the proxy IP addresses, it will find that the proxy IP address is in the same subnet as one of the IP addresses in its own network. Router 113 will then send an address resolution protocol (ARP) request for the MAC address that is associated with the proxy IP address. Accordingly, router 113 is requesting the physical machine address for the hardware device that is in the customer's network and is associated with the proxy IP address.

The proxy IP address should not be utilized by any of the hardware devices in the customer's network. Accordingly, no hardware devices in the customer's network should respond to the ARP request. However, router 111 can have modifications that allow it to detect such an ARP request. In other words, router 111 will recognize the ARP request for one of the proxy IP addresses that it advertised to router 113. Utilizing the proxy table, router 111 responds to the ARP request with the proxy MAC address.

Once 113 receives the response that specifies the proxy MAC address, the packet will be sent to the proxy MAC address. The forwarder in router 111 can be set up such that as when it receives a packet with the destination of the proxy MAC address, it does not need to do a full IP look up based on the destination IP address in the packet. Instead, router 111 can utilize the next hop table shown in FIG. 5 to determine the actual next hop address. Router 111 then forwards the packet to the next hop specified in the next hop table.

Router 111 does full IP layer forwarding (including TTL decrement, fragmentation, etc.) with the only difference being that router 111 does not need to store the full Internet routing table in its forwarder since it does not ever need to do a destination IP address based lookup. Thus, router 111 can achieve full Internet routing (at the maximum forwarding rate that its hardware supports) without needing to store the full Internet routing table in forwarder memory.

The preceding has described one embodiment of the invention in relation to an example. It may be beneficial now to describe processes that can be utilized in embodiments of the invention.

Figure 6:
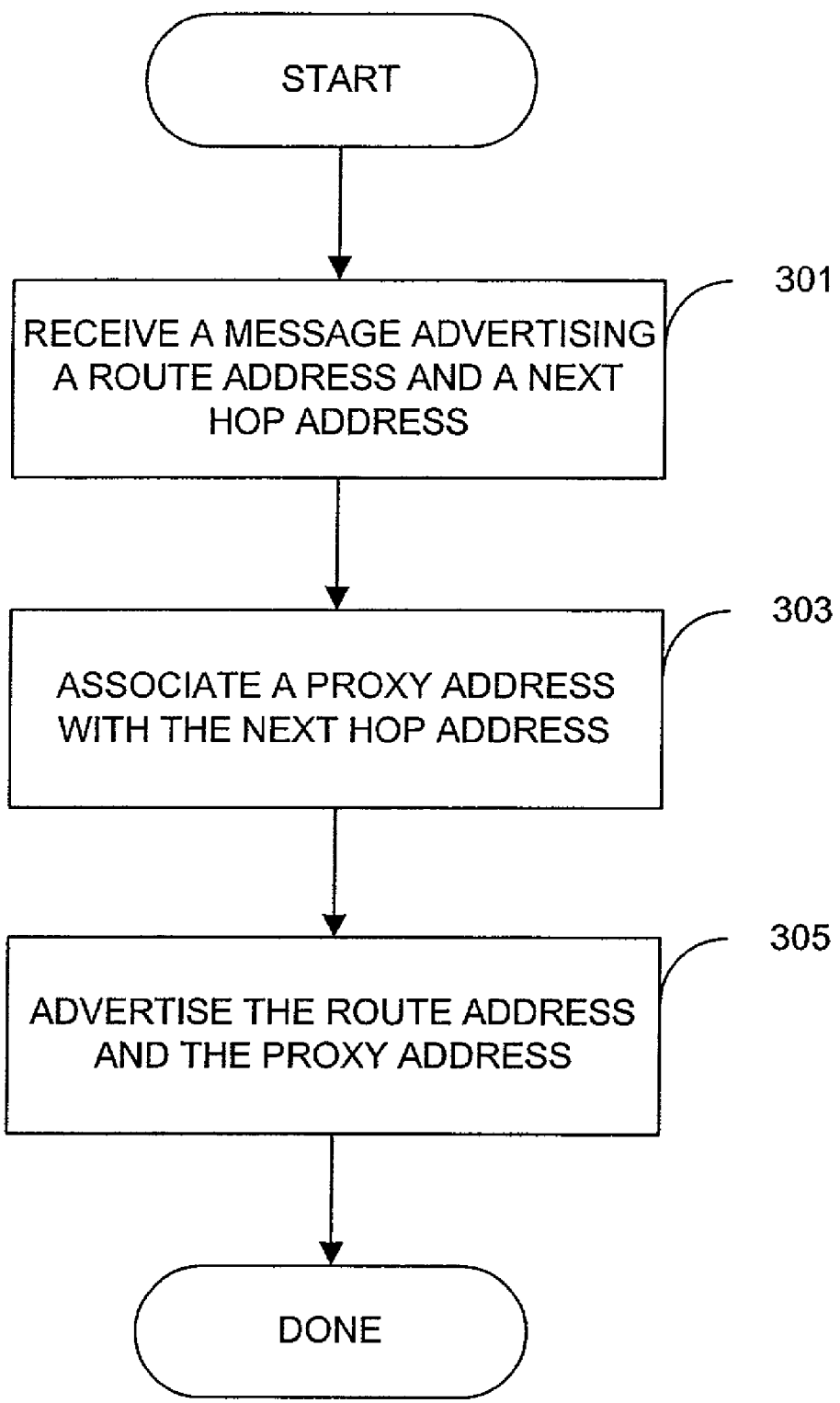
FIG. 6 shows a flowchart of a process of implementing forwarding in a network device according to one embodiment of the invention.

FIG. 6 shows a flowchart of a process of implementing forwarding in a network device in one embodiment. As with all the flowcharts herein, steps can be added, deleted, combined, and reordered without departing from the spirit and scope of the invention.

At a step 301, a message is received advertising a route address and a next hop address. Although, some embodiments utilize EBGP as the communications protocol, the invention can be advantageously applied to other protocols and other routes besides public Internet routes.

A proxy address is associated with the next hop address at a step 303. The proxy address is not associated externally with any other network device but is defined internally in the network device for forwarding. In some embodiments, the proxy address is associated with the next hop address through the use of tables. At a step 305, the route address and the proxy address are advertised. In some embodiments, the route address is a public Internet address.

Figure 7:
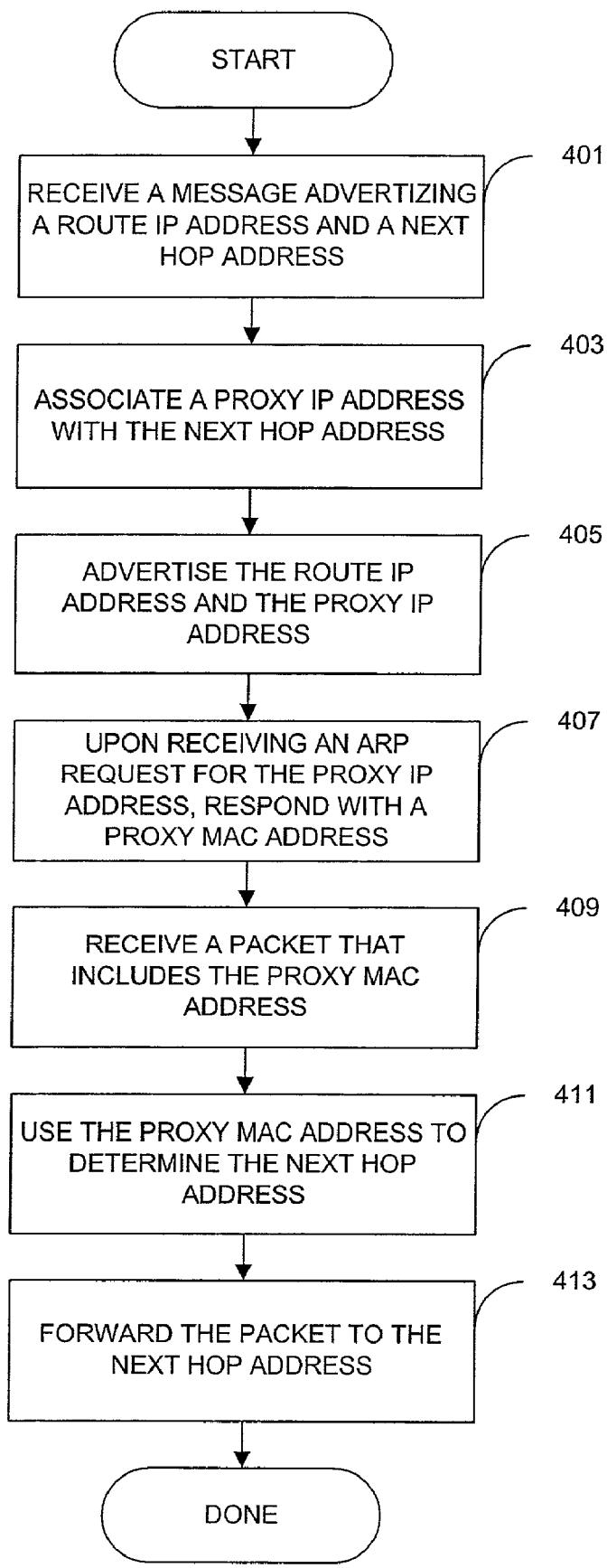
FIG. 7 shows a flowchart of a process of implementing forwarding in a network device according another embodiment of the invention.

FIG. 7 shows a flowchart of a method for implementing forwarding in a network device in another embodiment. In this embodiment, the route address an IP address and ARP request is utilized to resolve the correct next hop address.

At a step 401, a message advertising a route IP address and next hop address are received. Typically, EGBP is being utilized in a router and the message that is received is to advertise the next hop address.

A proxy IP address is associated with the next hop address at a step 403. In one embodiment, the proxy IP address is associated with a proxy MAC address and the proxy MAC address is associated with the next hop address. For example, the addresses can be associated by storing the addresses as entries in one or more tables.

At a step 405, the route IP address and the proxy IP address is advertised. Typically, the proxy IP address is in the same subnet as the targeted network.

Upon receiving an ARP request for the proxy IP address, a response is sent with a proxy MAC address at a step 407. The router that sent the ARP request will then send the packet to the proxy MAC address, such as by putting the proxy MAC address in the packet as the destination.

A packet that includes the proxy MAC address is received at a step 409. Typically, the proxy MAC address is removed or stripped from the packet. At a step 411, the proxy MAC address is used to determine the next hop address. For example, the proxy MAC address can be used as an index into a table to lookup the next hop address (e.g., FIG. 5). This is in stark contrast to using a conventional routing tale as shown in FIG. 3 where a full IP lookup based on the destination IP address in the packet. The next hop address can be inserted in the packet and forwarded to the next hop address at a step 413.

With some embodiments of the invention, only the PE router has to be modified and the other routers can be left unchanged. This provides the advantage that it is not necessary to change the functionality or configuration of other devices in the network.

In some embodiments, configuration parameters can be utilized to specify the range of values for the proxy IP and MAC addresses. In other embodiments, a systems administrator can be allowed to specify the proxy IP and MAC addresses.

Embodiments of the invention can be advantageously applied to other environments. For example, in the environment when EBGP is utilized between two routers that are not physically connected (e.g., connected via a logical TCP connection), the packets can be sent directly to another router to which the other two routers are physically connected. This third router will be in the path towards the proxy IP addresses that will be advertised inside the network. Additionally, it is not required that the third router be executing BGP at all.

In some embodiments, BGP route reflectors or confederations will be used to alleviate scaling problems in the service provider's network due to the full mesh required for IBGP sessions. In this environment, the PE router will learn of some routers internal to the service provider's network to be EBGP next hops. However, proxies for these next hops can be setup just like they are set up for truly external next hops using similar techniques. Thus, embodiments of the invention can be utilized, but the size of the tables that are utilized may need to be increased.

In some environments, a customer has chosen to run BGP because the customer has multiple gateways to the Internet and would like to use the optimal gateway for a particular destination. Therefore, even though the PE router advertises a next hop to the customer, the customer may not use the PE router as the exit point for that destination (e.g., using another ISP router). Embodiments of the invention can still be advantageously applied to this environment because the PE router will still achieve the benefit of drastically smaller forwarding tables.

The above description has described applying the invention to an environment where EBGP is utilized between a PE router and a CE router. However, embodiments of the invention can be advantageously applied to routers in other environments, such as between two service providers. Thus, the invention can be advantageously applied to optimize forwarding of through traffic in a transit AS while normal full Internet routing is used for traffic originating in the AS itself.

While the above is a complete description of preferred embodiments of the invention, there is alternatives, modifications, and equivalence can be used. It should be evident that the invention is equally applicable by making appropriate modifications to the embodiments described above. For example, although the embodiments described above have been described in reference to BGP, embodiments of the invention can be applied to other protocols including MPLS. Therefore, the above description should not be taken as limiting the scope of the invention as defined by the metes and bounds of the appended claims along with their full scope of equivalence.

What is claimed is:

1. A method for implementing forwarding in a network device, comprising:
   receiving at the network device, a message advertising a route address and a next hop address;
   assigning at the network device, a proxy IP address associated with a proxy MAC address to the next hop address, wherein the proxy IP address is not associated externally with any other network device but is defined internally in the network device for forwarding; and
   advertising the route address and the proxy IP address at the network device;
   wherein the proxy IP address is advertised in place of the next hop address for all route addresses through the network device.

2. The method of claim 1, wherein packets that are received destined for the proxy IP address are sent to the next hop address.

3. The method of claim 1 further comprising storing the proxy IP address and the associated proxy MAC address in a first table and storing the proxy MAC address and the associated next hop address in a second table.

4. The method of claim 3 further comprising:
receiving a packet for forwarding at the network device; and
performing a lookup in the first and second tables to identify the next hop address.

5. An apparatus, comprising:
a processor that receives a message advertising a route address and a next hop address, assigns a proxy IP address associated with a proxy MAC address to the next hop address, and advertises the route address and the proxy IP address, wherein the proxy IP address is not associated externally with any other network device but is defined internally in the network device for forwarding and the proxy IP address is advertised in place of the next hop address for all route addresses through the network device; and
a memory that stores data for the processor.

6. The apparatus of claim 5 wherein said stored data comprises a first table storing the proxy IP address and the associated MAC address and a second table storing the MAC address and the associated next hop address.

7. An apparatus for implementing forwarding in a network device, comprising:
means for receiving at the network device, a message advertising a route address and a next hop address;
means for assigning at the network device, a proxy IP address associated with a proxy MAC address to the next hop address, wherein the proxy IP address is not associated externally with any other network device but is defined internally in the network device for forwarding and the proxy IP address is advertised in place of the next hop address for all route addresses through the network device; and
means for advertising the route address and the proxy IP address at the network device.

8. A method for implementing forwarding in a network device, comprising:
receiving at the network device, a first message advertising a route IP address and a next hop address;
associating at the network device, a proxy IP address with the next hop address, wherein the proxy IP address is associated with a proxy MAC address and the proxy MAC address is associated with the next hop address;
advertising at the network device, the route IP address and the proxy IP address;
upon receiving at the network device, an ARP request for the proxy IP address specified by a packet, responding with the proxy MAC address;
receiving at the network device, the packet that includes the proxy MAC address;
using the proxy MAC address to determine the next hop address at the network device; and
forwarding the packet from the network device to the next hop address.

9. The method of claim 8, wherein the proxy IP address is not associated externally with any other network device but is defined internally in the network device for forwarding.

10. The method of claim 8, further comprising removing the proxy MAC address from the packet.

11. The method of claim 8, further comprising inserting the next hop address into the packet.

12. The method of claim 8, wherein the proxy IP address is advertised in place of the next hop address for all route IP address through a network device.

13. The method of claim 8, wherein packets that are received destined for the proxy MAC address are sent to the next hop address.

14. The method of claim 8, wherein the proxy IP address and the proxy MAC address are stored in a proxy table.

15. The method of claim 8, wherein the proxy MAC address and the next hop address are stored in a next hop table.

16. The method of claim 8, wherein the proxy IP address is in the same subnet as a network to which the route IP address and the proxy IP address are advertised.

17. The method of claim 8, wherein the network device is a provider's edge router and the route IP address and the proxy IP address are advertised to a customer's edge router.

18. An apparatus, comprising:
a processor that receives a first message advertising a route IP address and a next hop address; associates a proxy IP address with the next hop address, wherein the proxy IP address is associated with a proxy MAC address and the proxy MAC address is associated with the next hop address; advertises the route IP address and the proxy IP address; upon receiving an ARP request for the proxy IP address specified by a packet, responds with the proxy MAC address; receives the packet that includes the proxy MAC address; uses the proxy MAC address to determine the next hop address; and forwards the packet to the next hop address; and
a memory that stores data for the processor.

19. An apparatus for implementing forwarding in a network device, comprising:
means for receiving at the network device, a first message advertising a route IP address and a next hop address;
means for associating at the network device, a proxy IP address with the next hop address, wherein the proxy IP address is associated with a proxy MAC address and the proxy MAC address is associated with the next hop address;
means for advertising at the network device, the route IP address and the proxy IP address;
means for, upon receiving at the network device, an ARP request for the proxy IP address specified by a packet, responding with the proxy MAC address;
means for receiving at the network device, the packet that includes the proxy MAC address;
means for using at the network device, the proxy MAC address to determine the next hop address; and
means for forwarding the packet from the network device to the next hop address.

* * * * *